US012327107B1

(12) United States Patent
Shay et al.

(10) Patent No.: US 12,327,107 B1
(45) Date of Patent: Jun. 10, 2025

(54) DYNAMIC ENDPOINT MATCHING IN ASSET MANAGEMENT SYSTEM

(71) Applicant: Axonius Solutions Ltd., Tel-Aviv (IL)

(72) Inventors: Eli Shay, Harish (IL); Oded Eliyahu Shimon, Holon (IL); Ben Shimon Hazout, Gan Yavne (IL); Avital Yahel, Harish (IL); Ran Avital, Omer (IL)

(73) Assignee: Axonius Solutions Ltd., Tel-Aviv (IL)

( * ) Notice: Subject to any disclaimer, the term of this patent is extended or adjusted under 35 U.S.C. 154(b) by 0 days.

(21) Appl. No.: 18/964,747

(22) Filed: Dec. 2, 2024

(51) Int. Cl.
*G06F 8/65* (2018.01)

(52) U.S. Cl.
CPC ...................... *G06F 8/65* (2013.01)

(58) Field of Classification Search
CPC ......................................................... G06F 8/65
See application file for complete search history.

(56) References Cited

U.S. PATENT DOCUMENTS

| | | | | |
|---|---|---|---|---|
| 10,235,380 | B2 * | 3/2019 | Brown | G06F 16/58 |
| 10,248,695 | B2 * | 4/2019 | Beier | G06F 16/2433 |
| 10,789,610 | B2 * | 9/2020 | Smith | G06N 20/00 |
| 2011/0302064 | A1 * | 12/2011 | Dunkeld | H04L 63/10 |
| | | | | 717/172 |
| 2015/0254348 | A1 * | 9/2015 | Alasaarela | G06F 16/283 |
| | | | | 717/104 |
| 2016/0012084 | A1 * | 1/2016 | Flores | G06F 16/13 |
| | | | | 707/748 |
| 2017/0091692 | A1 * | 3/2017 | Guo | G06V 10/761 |
| 2020/0175553 | A1 * | 6/2020 | Yalamanchili | G06Q 30/0276 |
| 2021/0073282 | A1 * | 3/2021 | Hunter | G06N 3/086 |
| 2021/0365420 | A1 * | 11/2021 | Sahu | G06N 20/00 |
| 2024/0129318 | A1 * | 4/2024 | Vandeventer | H04L 63/102 |
| 2024/0152887 | A1 * | 5/2024 | Filter | H04L 9/50 |

FOREIGN PATENT DOCUMENTS

CN          107408281 A   *  11/2017  .......... G06F 16/285

* cited by examiner

*Primary Examiner* — Daxin Wu

(57) ABSTRACT

A method for managing assets in a computerized system comprises dynamically recalculating correlations when data changes. The method involves detecting faulty reference values in digital asset-descriptors by computing reliability scores for attribute values used in creating the asset-descriptors. When a reliability score falls below a threshold, the corresponding attribute value is identified as a faulty reference value. The method then selects faulty digital asset-descriptors created based on the faulty reference value, computes new digital asset-descriptors using the faulty ones, and executes management operations using the new asset-descriptors.

16 Claims, 9 Drawing Sheets

DYNAMIC ENDPOINT MATCHING IN ASSET MANAGEMENT SYSTEM

BACKGROUND

Some embodiments described in the present disclosure relate to managing assets of a computerized system, and more particularly, but not exclusively, to managing assets of a computerized system associated with a plurality of management domains.

As used herein, the term "device" refers to an entity connected to a digital communication network and having an identifier unique within a management domain. Some examples of a device are a computer, a network device, such as a router, and a virtual machine, executed by a host machine. Some additional examples of a device are a computer peripheral device, such as a printer, a digital storage device, and a nonstandard computing device that connects to a network and has an ability to transmit data (commonly known as an Internet Of Things device), such as a thermostat, a light bulb controller, and an electrical switch. Some examples of a management domain are a device deployment domain, a user management domain and a security domain.

As used herein, the term "user" refers to a person or computerized agent having an identifier unique within a user management domain. For example, a user may be an employee of the organization. Some example of a user management domain include a human resources management tool.

Modern environments, for example enterprise organizations, rely on complex networks of interconnected devices, software applications, and users, such that such an environment comprises a plurality of assets. An asset may be a hardware component. An asset may be a software component. An asset may be a network-connected device.

Managing these diverse assets efficiently is crucial for maintaining security, ensuring compliance, and optimizing operational performance. In the field of Information Technologies (IT), the term "asset management" refers to the systematic process of tracking, managing, maintaining, and optimizing an organization's IT assets throughout their lifecycle. The term "asset management system" refers to a tool or a set of tools for managing a plurality of assets of the computerized system. Asset management systems have evolved to address this need, providing organizations with tools to track, monitor, and manage their diverse IT assets.

As used herein, the term "management domain" refers to a distinct area of IT asset management, typically associated with a specific tool, system, or set of processes that handles a particular aspect of asset information and control. A management domain has an identified scope of assets it manages or monitors. The scope of assets a management domain manages may be based on, for example, asset type (e.g., hardware, software, user accounts), organizational division (e.g., department, geographical location), or functional area (e.g., security, inventory, performance). The scope may be based on a combination of criteria.

In traditional asset management systems the management of assets is distributed across multiple specialized domains, each focused on specific aspects of asset management. The term "domain manager", as used herein, refers to a tool or a set of tools for managing a plurality of assets of the computerized system in a management domain.

SUMMARY

It is an object of some embodiments described in the present disclosure to provide a system and a method for managing assets in a computerized system by dynamically recalculating correlations when data describing the assets changes. This innovative approach addresses the challenges of maintaining accurate asset correlations in environments where information is gathered from multiple sources and may change over time. The method comprises detecting a faulty reference value in a plurality of digital asset-descriptors, optionally by computing reliability scores for attribute values used in creating the plurality of asset-descriptors. Optionally, when a reliability score falls below a threshold the corresponding attribute value is identified as a faulty reference value. The method then optionally selects one or more faulty digital asset-descriptors of the plurality of digital asset-descriptors, created based on the faulty reference value. Optionally, the method computes one or more new digital asset-descriptors using the one or more faulty digital asset-descriptors, and optionally executes one or more management operations using the one or more new digital asset-descriptors. Some examples of a management operation include modifying one or more values in a configuration file of the system or in another configuration file of a device of a plurality of devices of the system, installing one or more software applications on one or more devices of a plurality of devices of the system, and sending a domain manager of a management domain an instruction to execute an operation of the management domain. Some other examples include fetching information describing an asset consistently via an application programming interface (API) of the asset management system and exporting data from the asset management system for integration with other systems and additionally or alternatively for using in reports. A management operation may be performed by management software, for example a security management tool or an instrumentation tool (for installations, updates etc.). This approach enables the system to adapt to new information and correct correlations, reducing the risk of over-correlation and enhancing cybersecurity in asset management systems, while reducing an amount of computing resources, including an amount of memory and an amount of processing resources, required to do so as new descriptors are computed only for asset-descriptors that were created based on a faulty correlation and not for the entire plurality of records of the system.

The foregoing and other objects are achieved by the features of the independent claims. Further implementation forms are apparent from the dependent claims, the description and the figures.

According to a first aspect, a method for managing a plurality of assets of a computerized system comprises: detecting in a plurality of digital asset-descriptors, each describing one of a plurality of assets of the computerized system, a faulty reference value, including: computing, using a plurality of digital records, each describing one of the plurality of assets and received from a domain manager of a management domain of the computerized system, at least one reliability score for at least one attribute value of at least one attribute of a plurality of asset attributes of the plurality of assets where the at least one attribute value of the at least one attribute was used when creating the plurality of digital asset-descriptors; and subject to an outcome of comparing a reliability score of the at least one reliability score to a threshold reliability value, identifying an attribute value for which the reliability score was computed as a faulty reference value; selecting from the plurality of digital asset-descriptors a faulty digital asset-descriptor created based on the faulty reference value; computing at least one new digital asset-descriptor using the faulty digital asset-descriptor, each describing an asset of the plurality of assets; and executing in the computerized system and using a new digital asset-descriptor of the at least one new digital asset-descriptor at least one management operation associated with an asset described by the new digital asset-descriptor.

According to a second aspect, a system for managing a plurality of assets of a computerized system comprises at least one hardware processor configured to: detect in a plurality of digital asset-descriptors, each describing one of a plurality of assets of the computerized system, a faulty reference value, including by: computing, using a plurality of digital records, each describing one of the plurality of assets and received from a domain manager of a management domain of the computerized system, at least one reliability score for at least one attribute value of at least one attribute of a plurality of asset attributes of the plurality of assets where the at least one attribute value of the at least one attribute was used when creating the plurality of digital asset-descriptors; and subject to an outcome of comparing a reliability score of the at least one reliability score to a threshold reliability value, identifying an attribute value for which the reliability score was computed as a faulty reference value; select from the plurality of digital asset-descriptors a faulty digital asset-descriptor created based on the faulty reference value; compute at least one new digital asset-descriptor using the faulty digital asset-descriptor, each describing an asset of the plurality of assets; and execute in the computerized system and using a new digital asset-descriptor of the at least one new digital asset-descriptor at least one management operation associated with an asset described by the new digital asset-descriptor.

According to a third aspect, a software program product for managing a plurality of assets of a computerized system comprises: a non-transitory computer readable storage medium; first program instructions for detecting in a plurality of digital asset-descriptors, each describing one of a plurality of assets of the computerized system, a faulty reference value, including: computing, using a plurality of digital records, each describing one of the plurality of assets and received from a domain manager of a management domain of the computerized system, at least one reliability score for at least one attribute value of at least one attribute of a plurality of asset attributes of the plurality of assets where the at least one attribute value of the at least one attribute was used when creating the plurality of digital asset-descriptors; and subject to an outcome of comparing a reliability score of the at least one reliability score to a threshold reliability value, identifying an attribute value for which the reliability score was computed as a faulty reference value; second program instructions for selecting from the plurality of digital asset-descriptors a faulty digital asset-descriptor created based on the faulty reference value; third program instructions for computing at least one new digital asset-descriptor using the faulty digital asset-descriptor, each describing an asset of the plurality of assets; and fourth program instructions for executing in the computerized system and using a new digital asset-descriptor of the at least one new digital asset-descriptor at least one management operation associated with an asset described by the new digital asset-descriptor. According to the third aspect, the first, second, third and fourth program instructions are executed by at least one computerized processor from the non-transitory computer readable storage medium.

With reference to the first and second aspects, in a first possible implementation of the first and second aspects the management domain is one of a plurality of management domains of the computerized system and the domain manager is one of a plurality of domain managers for managing the computerized system.

With reference to the first and second aspects, or the first implementation of the first and second aspects, in a second possible implementation of the first and second aspects the method further comprises: creating the plurality of digital asset-descriptors, comprising applying a plurality of rules to another plurality of digital records, each of the other plurality of digital records describing another of the plurality of assets and received from another domain manager of another management domain of the computerized system, wherein applying a rule of the plurality of rules comprises comparing one or more attribute values in one or more of the other plurality of digital records to determine which records describe a common asset; and for each attribute value used when creating the plurality of digital asset-descriptors, maintaining at least one reference from the attribute value to at least one digital asset-descriptor created based on the attribute value using the plurality of rules. Optionally, selecting the faulty digital asset-descriptor comprises using the reference from the faulty reference value to identify which of the plurality of digital asset-descriptors were created based on the faulty reference value. Optionally, the reference from the attribute value to the at least one digital asset-descriptor further comprises at least one rule reference to at least one rule of the plurality of rules used when creating the at least one digital asset-descriptor and computing the at least one new digital asset-descriptor comprises removing from the faulty digital asset-descriptor one or more values added according to the at least one rule referenced by the at least one rule reference of the reference from the faulty reference value to the faulty digital asset-descriptor. Maintaining a reference from an attribute value to a digital asset-descriptor created based on the attribute value, and further including in the reference to a rule used when creating the digital asset-descriptor reduces an amount of time and an amount of computation resources required to identify one or more faulty asset-descriptors that were created based on the attribute value if it is identified as a faulty reference value, for example compared to performing a search of the plurality of asset-descriptors and comparison of one or more values of an asset descriptor to the faulty reference value.

With reference to the first and second aspects, or the first implementation of the first and second aspects, in a third possible implementation of the first and second aspects computing the at least one new digital asset-descriptor using the faulty digital asset-descriptor comprises applying the plurality of rules to a set of digital records used to compute the faulty digital asset-descriptor and another set of digital records used to compute the reliability score of the faulty reference value. Optionally, computing the at least one reliability score comprises maintaining at least one score record-reference from the at least one reliability score to one or more records of the plurality of digital records used to compute the at least one reliability score. Optionally, each digital asset-descriptor of the plurality of digital asset-descriptors comprises one or more asset record-references to one or more other digital records of the other plurality of digital records used to create the digital asset-descriptor and the set of digital records used to compute the faulty digital asset-descriptor is selected from the other plurality of digital records using the one or more asset record-references of the faulty digital asset-descriptor and the other set of digital records used to compute the reliability score of the faulty reference value is selected from the plurality of digital records using the at least one score record-reference of the reliability score of the faulty reference value. Maintaining a reference from a score value, that is associated with an attribute value, to one or more digital records used to compute the score value reduces an amount of time and an amount of computation resources required for identifying the one or more faulty asset-descriptors created based on a faulty reference value, and additionally or alternatively reduces an amount of time and an amount of resources required to identify which records are needed to compute the one or more new asset-descriptors, for example compared to performing a search through the plurality of records of the system and comparing one or more values of a record to the faulty reference value.

With reference to the first and second aspects, or the first implementation of the first and second aspects, in a fourth possible implementation of the first and second aspects the plurality of digital records comprises the other plurality of digital records, received in a first iteration of a plurality of data collection iterations, and a new set of digital records received in a second iteration of the plurality of data collection iterations, and the new set of digital records is received after receiving the other plurality of digital records. Optionally, computing the at least one reliability score is in response to receiving the new set of digital records. Continuously receiving records describing the plurality of assets of the system, and computing the one or more reliability scores in response to receiving a new set of digital records allows early detection of a faulty correlation, reducing an amount of faulty management operations performed based on a faulty correlation between two or more assets, thus increasing stability and reliability of operation of the computerized system by reducing an amount of faulty management operations performed based on the faulty correlation. Optionally, computing the at least one reliability score is according to an identified schedule. Computing the one or more reliability scores according to an identified schedule increases reliability of operation of the computerized system by reducing a likelihood of a faulty correlation being undetected in the repeated checks.

With reference to the first and second aspects, in a fifth possible implementation of the first and second aspects the method further comprises in each of one or more iterations: subject to another outcome of comparing another reliability score of the at least one reliability score to the threshold reliability value, identifying another attribute value for which the other reliability score was computed as another faulty reference value; selecting from the plurality of digital asset-descriptors another faulty digital asset-descriptor created based on the other faulty reference value; and computing at least one other new digital asset-descriptor using the other faulty digital asset-descriptor, each describing another asset of the plurality of assets. Detecting more than one faulty reference value allows handling more than one faulty asset-descriptor, increasing accuracy of the plurality of asset-descriptors and thus increasing stability and accuracy of operation of the computerized system by increasing accuracy of management operations performed on the plurality of assets of the computerized system based on the plurality of asset-descriptors.

With reference to the first and second aspects, in a sixth possible implementation of the first and second aspects the at least one management operation comprises at least one of: installing an operating system update on one of the plurality of assets, and instructing execution of a management query by one of the plurality of assets.

With reference to the first and second aspects, in a seventh possible implementation of the first and second aspects the system further comprises at least one digital communication network interface connected to the at least one hardware processor and the at least one hardware processor is configured to receive at least some of the plurality of digital records via the at least one digital communication network interface. Optionally the domain manager comprises at least one other hardware processor configured to manage the computerized system in the management domain; and the at least one hardware processor is further configured to receive at least some of the plurality of digital records from the at least one other hardware processor. Optionally, the system further comprises a non-volatile digital storage connected to the at least one hardware processor and the at least one hardware processor is further configured to retrieve at least some of the plurality of digital records from the non-volatile digital storage.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1A:
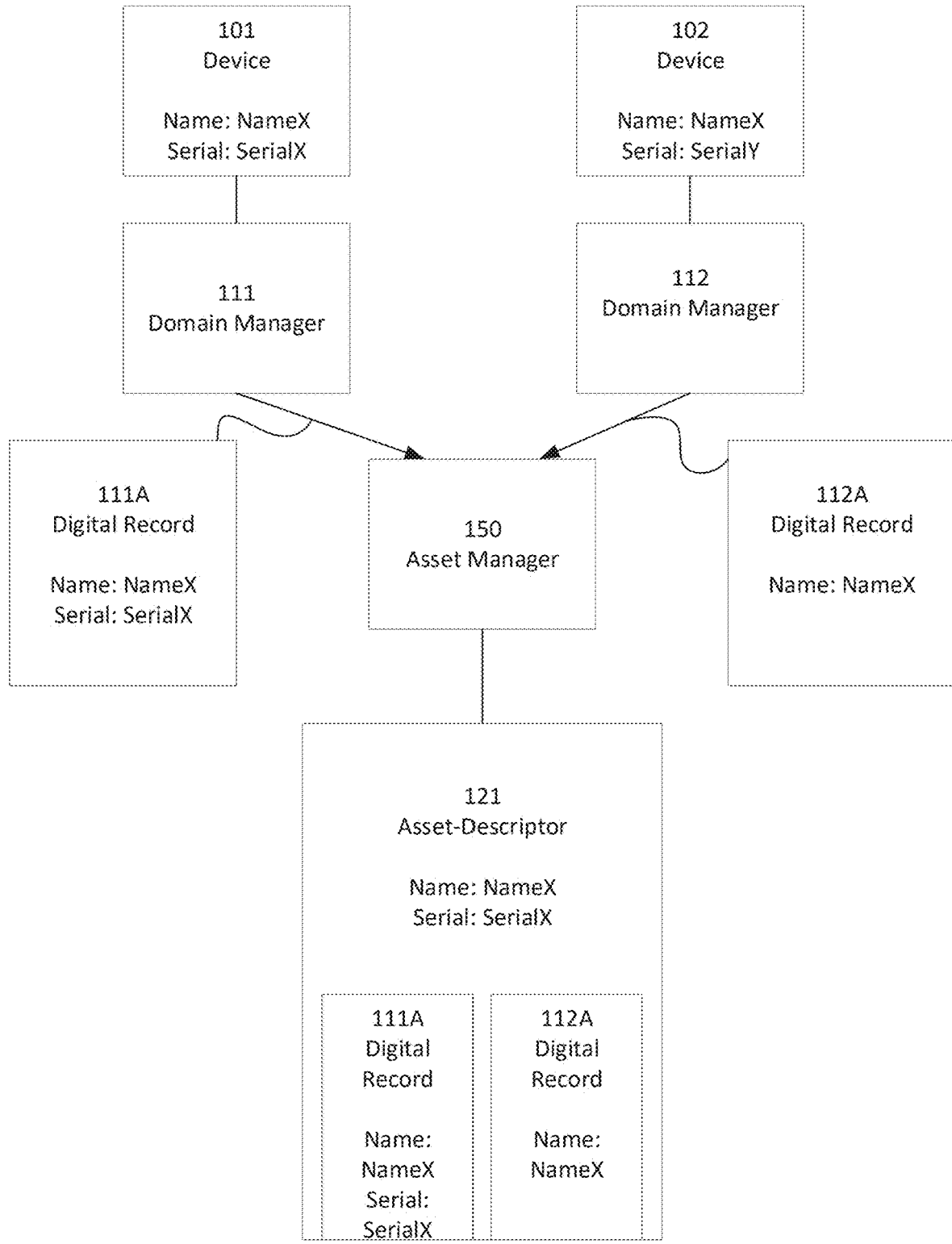
FIGS. 1A, 1B and 1C are schematic block diagrams of an exemplary correlation, according to some embodiments.

For brevity, unless otherwise noted the term "system" is used to mean "computerized system". Further, for brevity, unless otherwise noted henceforth the term "domain" is used to mean "management domain", and the terms are used interchangeably. In addition, for brevity the term "management system" is henceforth used to mean "asset management system" and unless otherwise noted the terms are used interchangeably.

In modern enterprise IT environments there is a growing need to maintain a comprehensive and consistent view of an organization's assets. When a computerized system comprises a plurality of management domains, and each of the management domains is managed independently, information about a single asset of a plurality of assets of the computerized system is spread across multiple domain managers, making it difficult to get a comprehensive view of the asset's status, history, and relationships with other assets of the plurality of assets. In addition, when asset information is updated in one management domain, it may not be immediately reflected in others, leading to inconsistencies and potential security risks. Furthermore, many IT processes and workflows span multiple management domains. For example, onboarding a new employee might involve actions in asset procurement, network configuration, security policy application, and identity management. Performing management tasks that span multiple management domains requires interacting with multiple domain managers, often manually. There is a need to combine the management of multiple management domains. This need stems from the increasing complexity of IT environments and the growing importance of holistic, efficient asset management. By addressing this need, organizations can achieve greater visibility, consistency, and control over their IT assets, leading to improved operational efficiency, reduced risks, and better strategic decision-making.

Within each management domain, an asset of the computerized system is represented as a distinct entity. To maintain a holistic view of all assets of a computerized system and their interrelationships, some enterprise organizations use an asset management system that combines and correlates information about the computerized system's assets from multiple management domains. To do so effectively, there is a need to identify unique assets, for example unique devices and unique users in the computerized system, and combine information pertaining to an identified asset. A view of a plurality of unique assets, combining for each unique asset information from multiple management domains, provides a single source of truth for all organizational assets, enabling better decision-making, improved security posture, enhanced operational efficiency, and more effective compliance management.

In the context of asset management, a scanner typically refers to a software tool or utility used to identify, track, and gather information about various assets within an organization's IT environment.

To create such a view of the computerized system, a management system often gathers asset data from multiple sources, creating a complex web of information that needs to be accurately correlated and managed. A source may be a domain manager. A source may be a scanner. The process typically involves two main phases: a fetch phase, where asset data is collected from various sources, and a correlation phase, where this data is analyzed to connect information from different sources to create a plurality of unique asset-descriptors, each describing one unique asset of the plurality of assets of the computerized system. This correlation process is particularly crucial in the Cyber Asset Attack Surface Management (CAASM) domain, where accurate asset correlation is essential for identifying and mitigating potential security vulnerabilities. Incorrect correlations can lead to significant cybersecurity gaps, potentially exposing organizations to threats. In addition, such a plurality of unique asset-descriptors reduces cost of operation of managing the plurality of assets, for example by reducing an amount of storage required to store data regarding the plurality of assets. For assets that are devices, identifying unique assets allows reducing an amount of power and/or an amount of time and/or an amount of computation resources required to perform a management operation on each of the plurality of assets by reducing an amount of times the management operation is executed on a single device. An example of a management operation is installation of an operating system update or execution of a management query. In addition, reducing an amount of times the management operation is executed on the single device may reduce a negative impact on an amount of resources of the single device and/or stability of the single device as it may be the case that executing a management operation more than once has one or more undesirable side effects on the single device. Some examples of an undesirable side effect are consuming additional resources, such as storage, with no functional advantage, and rendering some operation parameters of the single device inconsistent.

An asset in the computerized system may have one or more attributes whose value may uniquely identify the asset. Historically, a computerized system of an organization was made up of hardware and software components owned by the organization and installed on-premises, with identified users of the organization. In such systems, an organization may have tight control over managing the system's assets, so for example computer names may be guaranteed to be unique. Nowadays, however, there is increasing prevalence of computerized systems where at times some users connect to the system via a remote network connection. In such cases, a device used by a user may be owned by the user and not by the organization. In addition, a hardware device on-premises, for example a docking station or a conference audio device, may be used at different times by different users and connected at different times to different computing devices, such as laptops. As a result, attributes that previously may have been used to identify a device, for example a media access control (MAC) address or a computer name for a hardware device, might no longer be unique identifiers of a device, for example two user owned devices that have a common computer name or a MAC address of a conference audio device that is associated with both the conference audio device and a laptop connected to it, possibly a different laptop at different times. In another example, when an organization includes multiple sub-organizations with separate employee management systems, different employees may share a common employee identification number in different employee management systems.

Figure 1B:
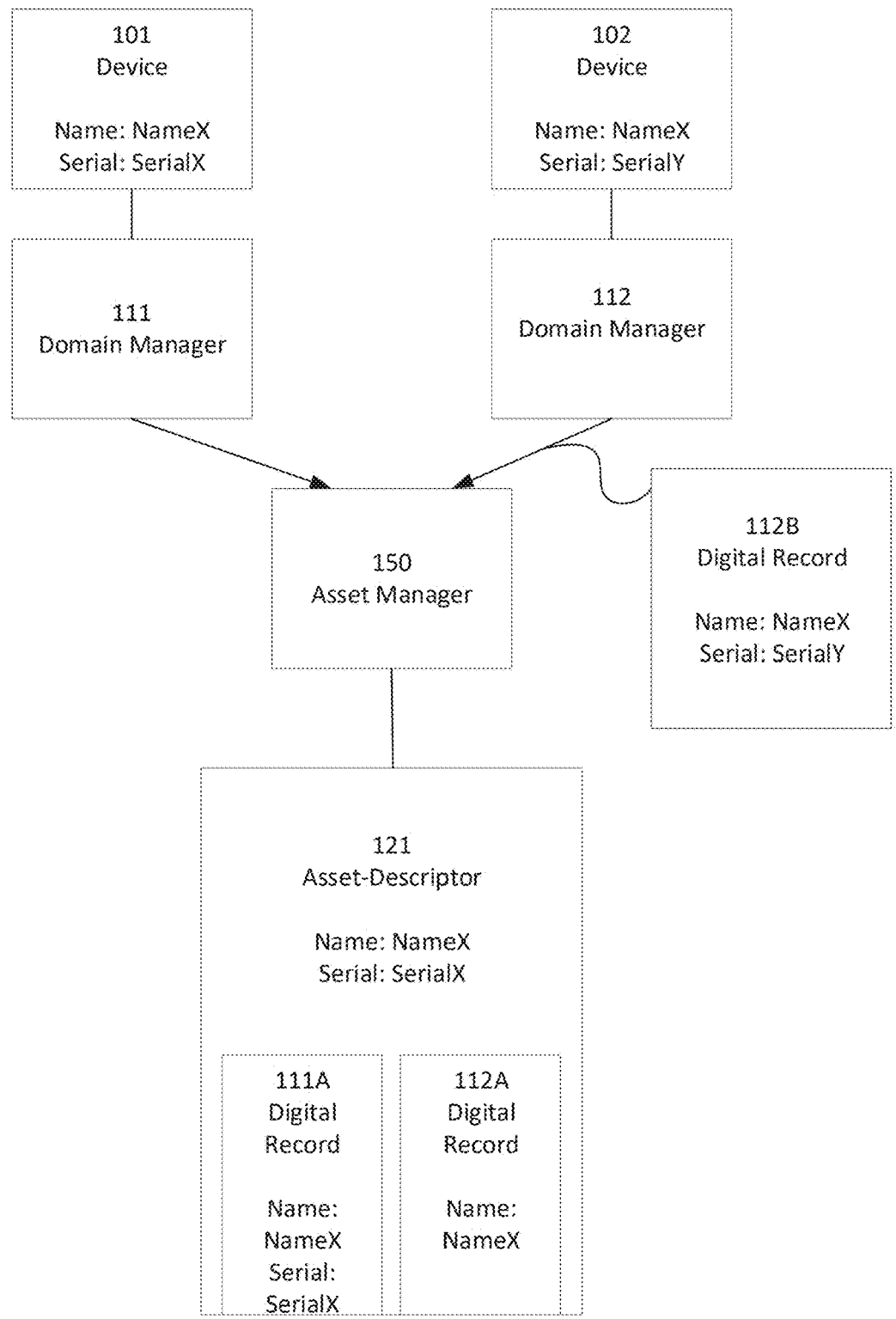
Figure 1C:
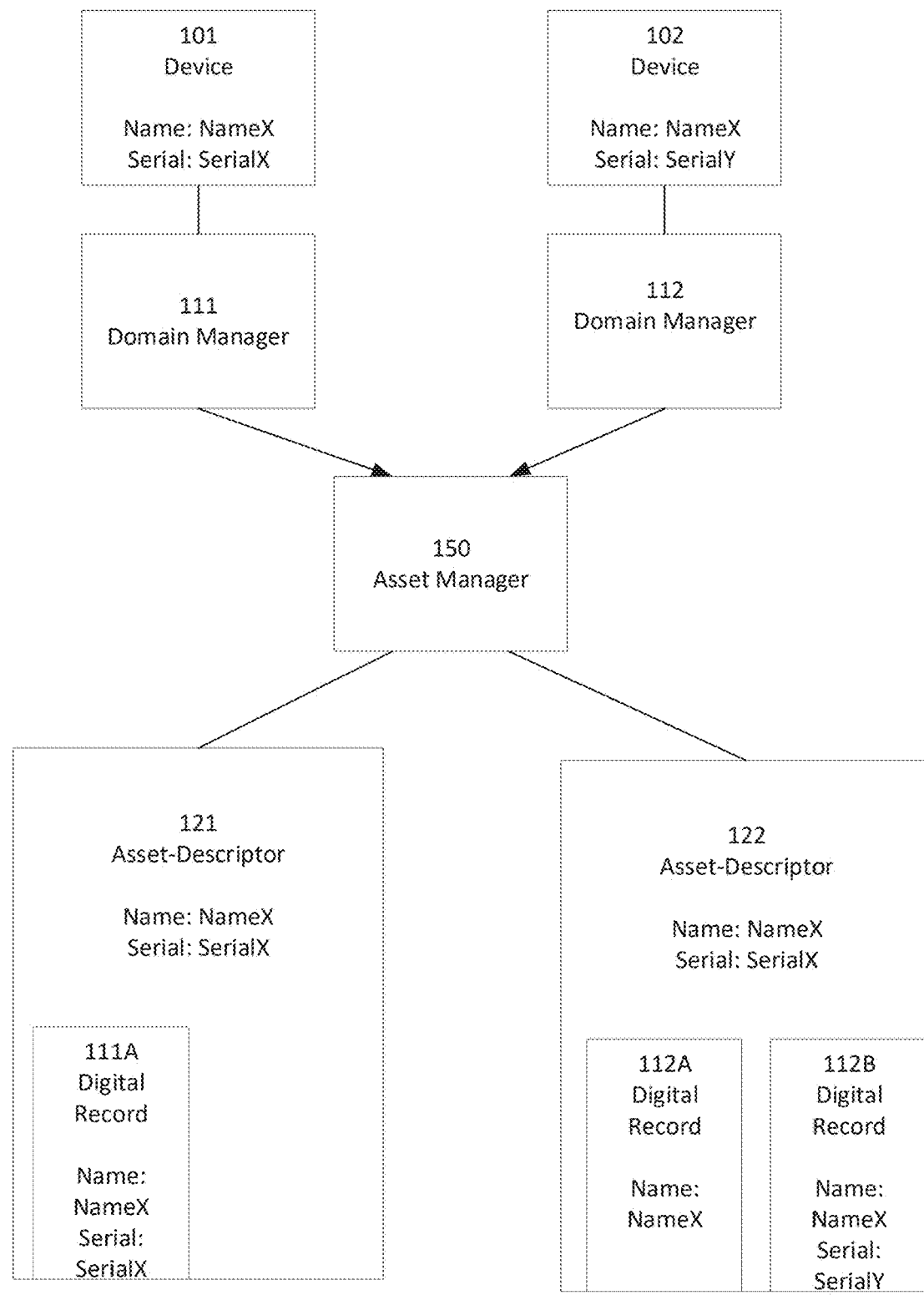

As time progresses and more data becomes available, initial correlations made with initial information may prove to be inaccurate. To illustrate a case where an initial correlation proves to be inaccurate, reference is now made to FIGS. 1A, 1B and 1C, showing schematic block diagrams of an exemplary correlation 100, according to some embodiments. With reference to FIG. 1A, in this example, a system comprises plurality of assets comprising device 101 and device 102. In this example, device 101 has a first attribute "device name" having a first value of "NameX" and a second attribute "serial number" having a second value of "SerialX". Also in this example, device 102 has the first attribute having a third value of "NameX" and the second attribute having a fourth value of "SerialY". In this example, device 101 is managed in a first domain by domain manager 111 and device 102 is managed in a second management domain by domain manager 112. Optionally, domain manager 112 is a scanner, configured to scan the computerized system.

In this example, domain manager 111 sends asset manager 150 digital record 111A, describing device 101 in the first management domain and comprising first attribute "device name" with first value "NameX" and second attribute "serial number" with second value "SerialX". Further in this example, domain manager 112 sends asset manager 150 digital record 112A, describing device 102 in the second management domain and comprising first attribute "device name" with third value "NameX". Optionally, asset manager 150 finds a correlation between the first value "NameX" of the first attribute received from first domain manager 111 in digital record 111A and the third value "NameX" of the first attribute received from second domain manager 112 in digital record 112A. As a result, asset manager optionally creates digital descriptor 121, comprising the first attribute "device name" having value "NameX" and the second attribute "serial number" have value "SerialX", and optionally associates descriptor 121 with digital record 111A and digital record 112A. In this example, record 121 reflects an identification that device 101 and device 102 are the same device and not separate devices.

With reference to FIG. 1B, domain manager 112 may send asset manager 150 another digital record 112B describing device 102 in the second management domain and comprising the first attribute with second value "NameX" and the second attribute with fourth value "SerialY". Asset manager 150 may detect that digital record 112A and digital record 112B, both received from domain manager 112, describe a common asset in the second domain, for example based on the first attribute having for both the value of "NameX", and may try to associate asset-descriptor 121 with digital record 112B. However, asset manager 150 may detect that fourth value "SerialY" of the second attribute "serial number" in digital record 112B is in conflict with first value of "SerialX" of the second attribute "serial number" of digital descriptor 121. This conflict between serial numbers may indicate to asset manager 150 that the correlation between digital record 111A and digital record 112A was faulty.

With reference to FIG. 1C, in this example asset manager 150 removes from asset-descriptor 121 the association with digital record 112B. In addition, in this example asset manager 150 creates a new asset-descriptor 122 comprising the first attribute "device name" having a value of "NameX" and the second attribute "serial number" having a value of "SerialY", and associated with digital record 112A and digital record 112B. Now in this example, asset-descriptor 121 describes device 101 and asset-descriptor 122 describes device 102 as separate asset. In another example, for example after determining that the attribute "device name" having a value of "NameX" is not a unique value for an asset, asset manager 150 may create asset-descriptor 122 comprising only the first attribute "device name" having a value of "NameX" and associated with digital record 112A, and yet another asset-descriptor comprising the first attribute "device name" having a value of "NameX" and the second attribute "serial number" having a value of "SerialY", and associated with digital record 112B. In this other example, asset-descriptor 121 describes device 101, asset-descriptor 122 describes device 102 as separate asset, and the yet other asset-descriptor describes device 102 as yet another separate asset.

There is a need for a management system that can dynamically reassess and recalculate these correlations as new data is introduced, ensuring that the asset management system maintains an accurate and up-to-date representation of the organization's assets.

Some management systems recalculate all correlations whenever new data is introduced. This approach suffers from several drawbacks. Recalculating all correlations every time new data is introduced requires processing the entire dataset, including unchanged data. This approach becomes increasingly resource-intensive as the volume of asset data grows. As the number of assets and the complexity of their relationships increase, full recalculation becomes progressively slower and more resource-intensive. This can limit the management system's ability to handle large-scale environments.

The present disclosure, in some embodiments described herein, proposes to identify faulty correlations and recalculate only such faulty correlations. To do so, the present disclosure proposes in such embodiments to identify an attribute value of an attribute of an asset as a faulty reference value, and to recalculate one or more correlations computed based on the faulty reference value. Referring back to exemplary correlation 100, attribute value "NameX" of the asset attribute "device name" is a faulty reference value, as it incorrectly correlated device 101 with device 102.

To detect a faulty reference value, the present disclosure proposes, in some embodiments described herein, computing a reliability score for each of one or more attribute values of one or more attributes of a plurality of attributes of a plurality of assets of a computerized system. Optionally, a faulty reference value is identified subject to an outcome of comparing a reliability score of an attribute value of an attribute to a threshold reliability value. Further in such embodiments, the present disclosure proposes selecting from a plurality of digital asset-descriptors a faulty asset-descriptor that was created based on the faulty reference value, and computing one or more new digital asset-descriptors using the faulty asset-descriptor.

In exemplary correlation 100, asset-descriptor 121 is a faulty asset-descriptor, created based on faulty reference value "NameX" of attribute "device name". Using asset-descriptor 121, asset manager 150 optionally creates asset-descriptor 121 by removing from asset-descriptor 121 association with digital record 112A, and new asset-descriptor 122 by associating new asset-descriptor 122 with digital record 112A, formerly associated with asset-descriptor 121.

Optionally, a reliability score for an attribute value of an asset attribute is computed using a measure of attribute credibility of the asset attribute. For example, a serial number may have a higher measure of attribute credibility than a computer name. Optionally, a reliability score for the attribute value of the asset attribute is computed using another measure of attribute credibility of another asset attribute. For example, a cloud identifier may have a lower measure of credibility when computing a score for a computer name than a serial number has when computing the score for the computer name.

Optionally, the reliability score for the attribute value of the asset attribute is computed using one or more measures of source credibility of one or more sources of one or more digital records comprising the attribute value of the asset attribute. For example, a value received from a domain manager may have a higher measure of source credibility than a value received from a scanner.

Optionally, the reliability score for the attribute value of the asset attribute is computed using a measure of rule adherence of the attribute value, reflecting an amount of rules which apply to the attribute value of the attribute and result in a conflict. For example, when a rule applied to a first attribute value results in a conflict in a second attribute value, a measure of rule adherence of the first attribute value may be reduced. Optionally, a reliability score computed for the first attribute value reflects this reduction. For example, when a rule requiring that an asset has only one serial number is applied to digital record 111A and digital record 111B, since second value "Serial X" conflicts with fourth value "Serial Y", rule adherence measure of value "NameX" of asset attribute "device name" is reduced, reducing a reliability score computed for value "NameX" of asset attribute "device name".

A reliability score provides a quantitative measure of how trustworthy and/or consistent an attribute value of an asset attribute is for the purpose of asset correlation. As new information is received, the scores can be updated, providing a real-time measure of data reliability. Furthermore, using a reliability score enable the management system to prioritize more consistent and trustworthy attributes when correlating assets, leading to more accurate results. Comparing a reliability score of an attribute value to a threshold reliability value provides a simple method to identify which correlation (or correlations) might not be reliable, allowing re-calculation of those correlations only without recalculating all correlations of an entire set of digital records. This increases accuracy of the plurality of unique asset-descriptors while requiring less computation resources compared to re-correlation of the entire set of digital records.

Optionally, one or more management operations are executed using at least one of the one or more new digital asset-descriptors. As the one or more digital asset-descriptors created as described above are more accurate in representing the plurality of assets of the computerized system than other descriptors generated without identifying a conflict in an earlier correlation, executing a management operation using such one or more digital asset-descriptors increases system stability of the computerized system and may be performed using fewer resources than if performed with the other descriptors.

Optionally, the plurality of asset-descriptors are created by applying a plurality of rules to a plurality of digital records, where each of the plurality of digital records describes one of a plurality of assets of the computerized system and is received from a domain manager of a management domain of the computerized system. Optionally, the domain is one of a plurality of management domains of the computerized system. Optionally, applying a rule of the plurality of rules comprises comparing one or more attribute values in one or more of the plurality of records, to determine which records describe a common asset. Optionally, one or more references are maintained from each attribute value used when creating the plurality of asset-descriptors to one or more of the plurality of asset-descriptors created based on the attribute value using the plurality of rules. In exemplary correlation 100, a reference is maintained between asset-descriptor 121 and attribute value "NameX" of attribute "device name". Optionally, the reference from the faulty reference value to the faulty asset-descriptor is used to identify which of the plurality of digital asset-descriptors were created based on the faulty reference value. Maintaining a reference from an attribute value to one or more digital asset-descriptors computed based on the attribute value reduces an amount of computing resources required to select the one or more digital asset-descriptors that may require re-computation, should the attribute value be identified as a faulty reference value.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object- Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
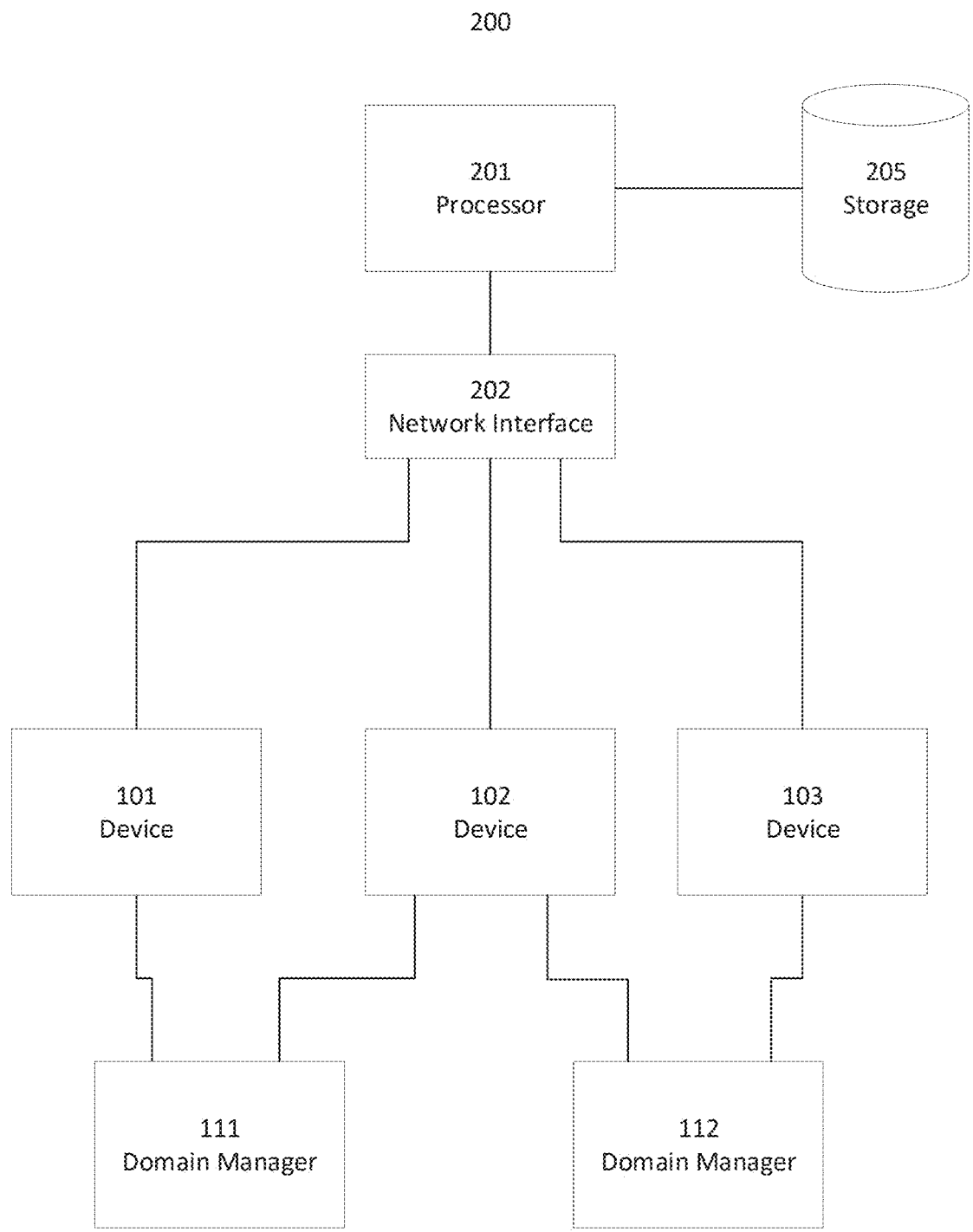
FIG. 2 is a schematic block diagram of an exemplary system, according to some embodiments.

Reference is now made also to FIG. 2, showing a schematic block diagram of an exemplary computerized system 200, according to some embodiments. In such embodiments, at least one hardware processor 201 is connected to one or more devices, for example device 101, device 102 and device 103. Examples of a device are a computer, a mobile computer, a network device such as a router, and a virtual machine executing on a host machine. For brevity, henceforth the term "processor" means "at least one hardware processor". Optionally, device 101, device 102 and device 103 are connected to processor 201 via at least one digital communication network. Optionally, the digital communication network is a Local Area Network (LAN), for example an Ethernet network or a wireless network. Optionally, the digital communication network is a Wide Area Network (WAN), for example the Internet. Optionally, processor 201 is connected to at least one digital communication network interface 202 for the purpose of connecting to device 101, device 102 and device 103 via the at least one digital communication network.

Optionally, some of the one or more devices are associated with one of a plurality of management domains. Optionally, system 200 comprises one or more domain managers, each associated with one of the plurality of management domains. For example, domain manager 111 may be associated with a first management domain of the plurality of management domains and domain manager 112 may be associated with a second management domain of the plurality of management domains. Optionally, domain manager 111 manages system 200 in the first management domain and domain manager 112 manages system 200 in the second management domain. Some examples of a management domain are Microsoft Active Directory, AWS, VmWare ESXi, and McAfee ePO. Optionally, a domain manager comprises one or more other processors, configured to manage system 200. Optionally, some of the one or more domain managers are connected to some of the one or more devices, optionally via at least one other digital communication network. For example, device 101 and device 102 are optionally associated with the first management domain of the plurality of management domains and may be connected to domain administrator 111. Optionally, device 102 and device 103 are associated with the second management domain of the plurality of management domains and may be connected to domain administrator 112. Optionally, at least one of the one or more domain managers manages assets that are not devices, additionally or alternatively to managing one or more devices. Some examples of an asset that is not a device include, but are not limited to, a software entity of a plurality of software entities of the computerized system and a user of the computerized system. A software entity may be a software application. Optionally a software entity is a service.

Optionally, one or more of the plurality of devices each have a storage. Examples of a storage are a random access memory and a hard disk. Optionally, device 102 has a storage.

Optionally, processor 201 is connected to at least one non-volatile digital storage 205 for the purpose of storing a plurality of digital asset-descriptors, each describing one of a plurality of assets of system 200. Some examples of a non-volatile digital storage are a magnetic hard disk, a solid state hard disk, a non-volatile random access memory (NVRAM), a network connected storage and a storage network.

For simplicity, the following description focuses on exemplary assets that are devices, however the methods described may be used for other types of assets as mentioned above.

To manage the plurality of assets, in some embodiments system 100 implements the following optional method. For brevity, henceforth the term "record" is used to mean "digital record", and the terms are used interchangeably.

Figure 3:
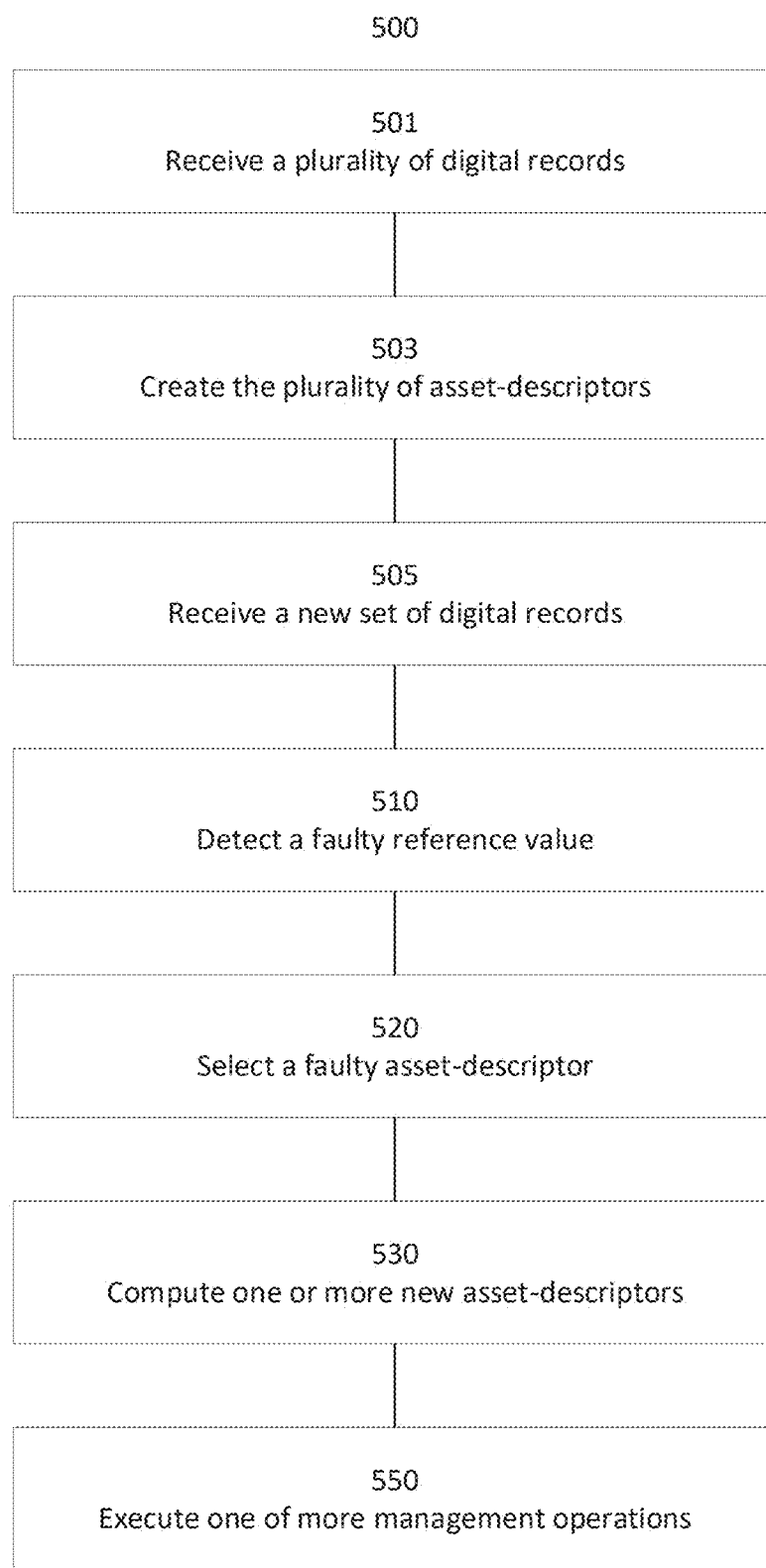
FIG. 3 is a flowchart schematically representing an optional flow of operations for managing a plurality of assets, according to some embodiments.

Reference is now made also to FIG. 3, showing a flowchart schematically representing an optional flow of operations 500 for managing a plurality of assets, according to some embodiments. In such embodiments, in 501 processor 201 accesses a plurality of digital records, each describing one of the plurality of assets of system 200 in one of the plurality of domains of system 200. Optionally, processor 201 receives at least some of the plurality of digital records from the one or more other processors of one or more of the plurality of domain managers, optionally via network interface 202. For example, processor 201 optionally receives record 111A from domain manager 111 and record 112A from domain manager 112. Optionally, processor 201 receives the at least some of the plurality of digital records in a first iteration of a plurality of data collection iterations. Optionally, processor 201 retrieves at least some other of the plurality of records from storage 205.

In 503, processor 201 optionally creates a plurality of digital asset-descriptors. For brevity, herein the term "asset-descriptor" is used to mean "digital asset-descriptor" and the terms are used interchangeably.

Figure 4:
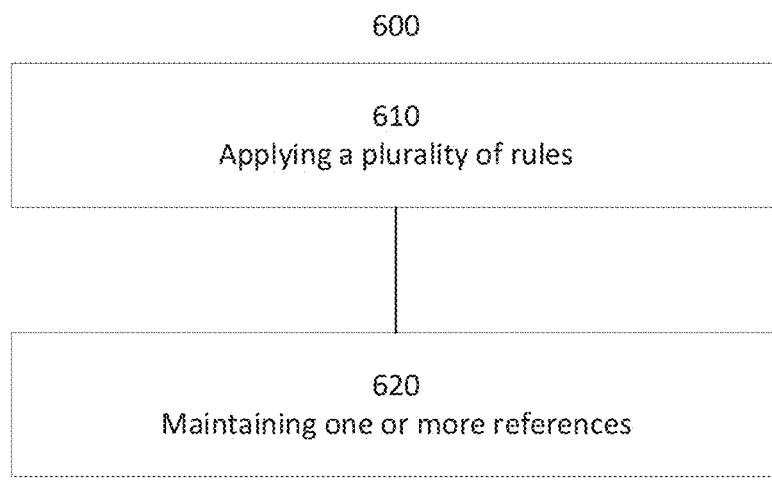
FIG. 4 is a flowchart schematically representing an optional flow of operations for creating a plurality of assets-descriptors, according to some embodiments.

Reference is now made also to FIG. 4, showing a flowchart schematically representing an optional flow of operations 600 for creating a plurality of assets-descriptors, according to some embodiments. In 610, processor 201 optionally applies a plurality of rules to the plurality of digital records. Optionally, applying a rule of the plurality of rules comprises comparing one or more attribute values in one or more of the plurality of records, optionally in order to determine which records of the plurality of records describe a common asset.

Figure 5:
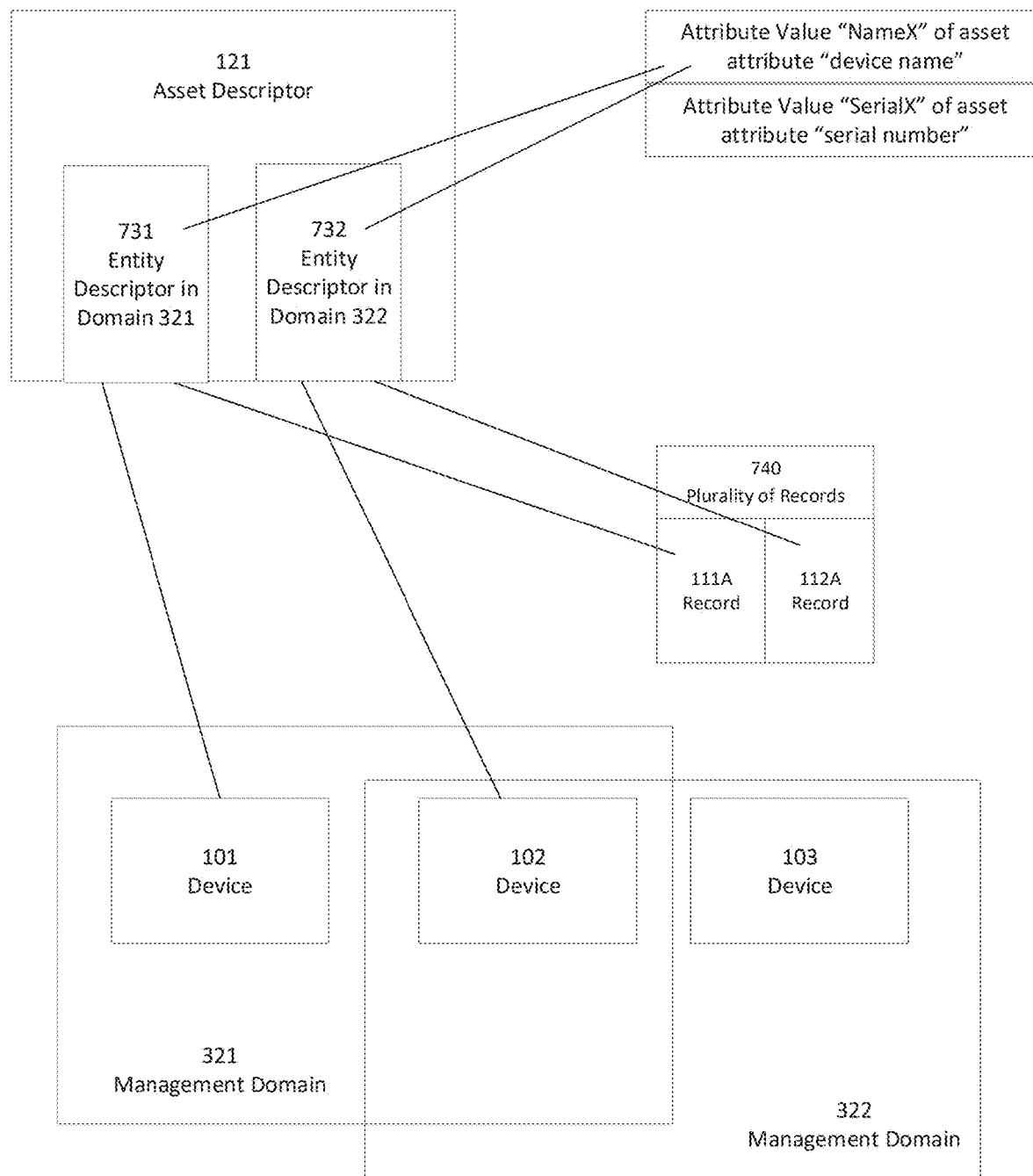
FIG. 5 is a schematic block diagram of an exemplary plurality of asset-descriptors, according to some embodiments.

Reference is now made also to FIG. 5, showing a schematic block diagram of an exemplary plurality of asset-descriptors 700, according to some embodiments. In this example, plurality of records 740 comprises record 111A and record 112A. Optionally, processor 201 compares attribute value "NameX" in record 111A to attribute value "NameX" in record 112A and optionally determines that record 111A and record 112A describe a common asset. Optionally, processor 201 creates asset-descriptor 121 to describe the common asset. Optionally, creating asset-descriptor 121 comprises including in asset-descriptor 121 an entity descriptor 731 describing device 101 in management domain 321. Entity descriptor 731 is optionally at least part of asset-descriptor 121. Optionally, asset-descriptor 121 references entity descriptor 731. Optionally, asset-descriptor 121 is associated with record 111A describing device 101 in management domain 321, optionally via entity descriptor 731, optionally by an asset record-reference. Optionally, creating asset-descriptor 121 comprises including in asset-descriptor 121 another entity descriptor 732 describing device 102 in management domain 322. Entity descriptor 732 is optionally at least another part of asset-descriptor 121. Optionally, asset-descriptor 121 references entity descriptor 732. Optionally, asset-descriptor 121 is associated with record 112A describing device 102 in management domain 322, optionally via entity descriptor 732, optionally by another asset record-reference.

Reference is now made again to FIG. 4. In 620, processor 201 optionally maintains for each attribute value used when creating the plurality of descriptors one or more references from the attribute value to one or more asset-descriptors created based on the attribute using the plurality of rules. Reference is now made again to FIG. 5. Optionally, processor 201 maintains a reference from attribute value "NameX" of asset attribute "device name" to asset descriptor 121, optionally via entity descriptor 731 and additionally or alternatively via entity descriptor 732. For example, processor 201 may maintain a list of references, comprising a reference from attribute value "NameX" of asset attribute "device name" to entity descriptor 731. Similarly, the list of references may comprise another reference from attribute value "NameX" of asset attribute "device name" to entity descriptor 732. Optionally, the reference from attribute value "NameX" of asset attribute "device name" to entity descriptor 731 comprises one or more rule references of one or more rules of the plurality of rules used when creating descriptor 121. For example, each of the plurality of rules may have a unique rule-identifier, and the reference from attribute value "NameX" of asset attribute "device name" to entity descriptor 731 optionally comprises a unique rule-identifier of a rule comparing attribute value "NameX" in record 111A to attribute value "NameX" in record 112A.

Optionally, when creating asset-descriptor 121 processor 201 computes a first reliability score for attribute value "NameX" of asset attribute "device name". Optionally, computing the first reliability score comprises maintaining one or more additional references (score record-reference) from the first reliability score to one or more records of plurality records 740, used when computing the first reliability score, for example record 111A and record 112A. These one or more score record-references allow accessing from the first reliability score the records used to compute the first reliability score, and hence access the asset-descriptor 121, associated with record 111A and record 112A, that was created based on the attribute value "NameX" of asset attribute "device name".

Figure 7:
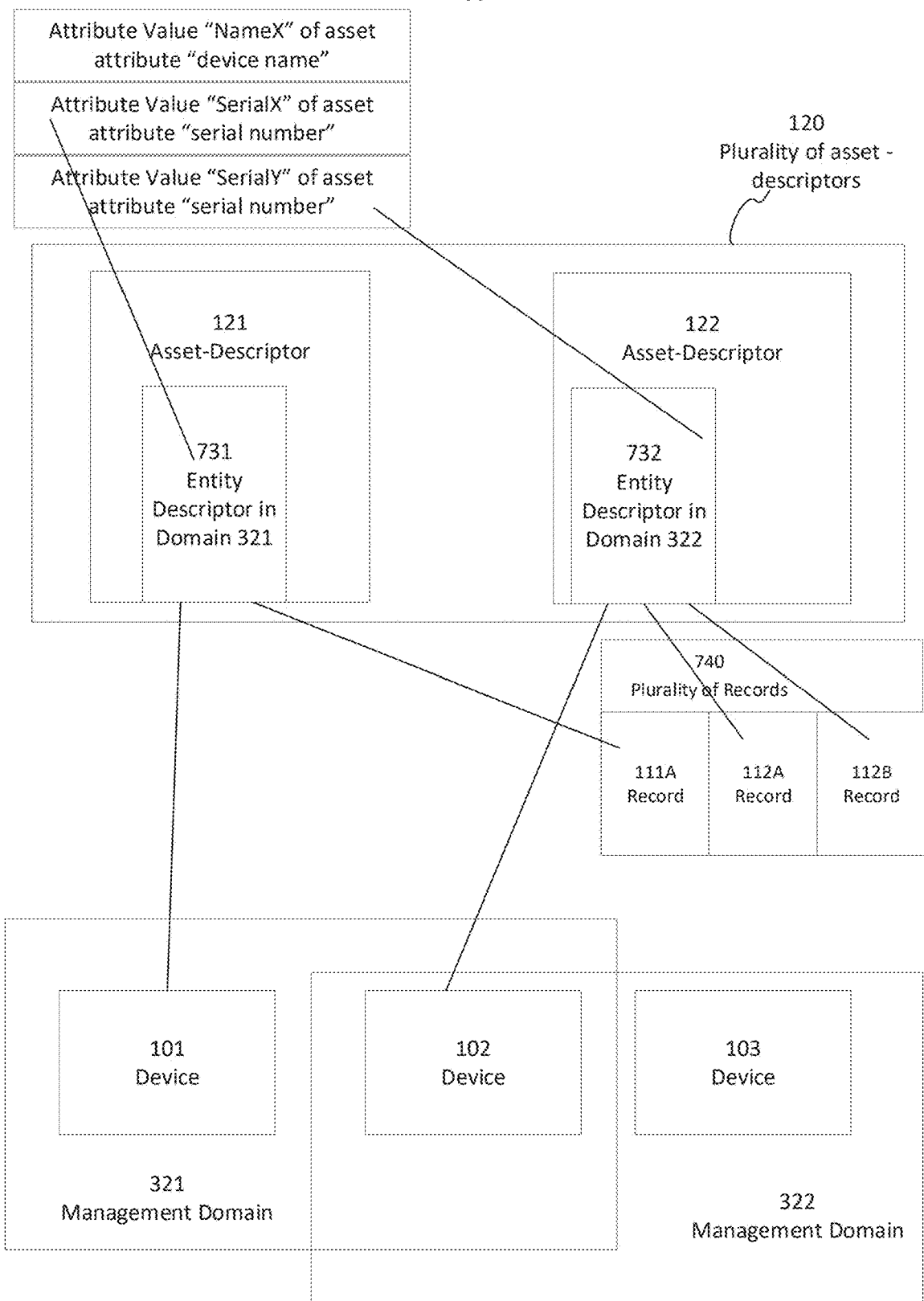
FIG. 7 is another schematic block diagram of the exemplary plurality of asset-descriptors, according to some embodiments.

Reference is now made again to FIG. 3. In 505, processor 201 optionally receives a new set of digital records, optionally from one or more of the plurality of domain managers, optionally via network interface 202. For example, in 505 processor 201 optionally receives record 112B from manager 112. Optionally, processor 201 receives the new set of digital records in a second iteration of the plurality of data collection iterations, where the new set of digital records is received after receiving the at least some records in the first iteration. Reference is now made also to FIG. 7, showing another schematic block diagram of the exemplary plurality of asset-descriptors 700, according to some embodiments. Optionally, processor 201 receives record 112B and adds record 112B to the plurality of records 740.

Figure 6:
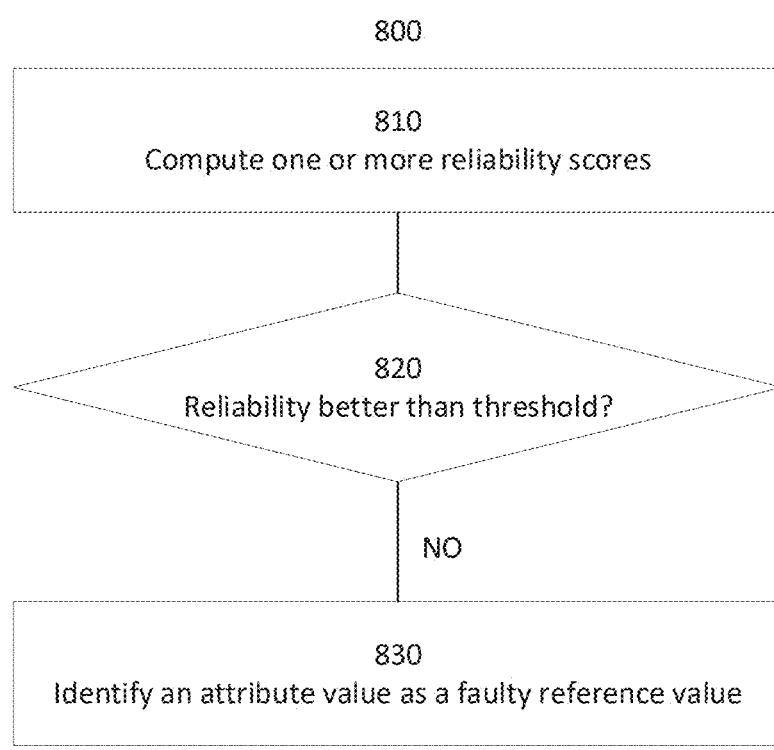
FIG. 6 is a flowchart schematically representing an optional flow of operations for identifying a faulty reference value, according to some embodiments.

Reference is now made again to FIG. 5. In 510, processor 201 optionally detects a faulty reference value. Reference is now made also to FIG. 6, showing a flowchart schematically representing an optional flow of operations 800 for identifying a faulty reference value, according to some embodiments. Optionally, in 810 processor 201 computes one or more reliability scores for one or more attribute values of one or more attributes of a plurality of asset attributes of the plurality of assets of system 200, where the one or more attribute values were used when computing the plurality of asset-descriptors. For example, processor 201 may compute a second reliability score for attribute value "NameX" of asset attribute "device name".

Optionally, a reliability score is one of two binary values, for example representing "good" and "bad". Optionally, a reliability score is a numerical value in a range of reliability score values, for example a value between 0 and 1. Other examples of a range of reliability score values include the range between 0 and 10, the range between 0 and 100 and the range between-100 and 100. Optionally, a reliability score is one of a set of reliability score values, for example a set comprising a plurality of values representing "best", "weak", "bad", and "worst". Optionally the set of reliability score values comprises a plurality of integer values. Optionally, a reliability score is a percentage value. For example, 100 may represent a best score of 100 percent.

Optionally, computing the second reliability score comprises maintaining one or more additional score record-references from the second reliability score to one or more records of plurality records 740, used when computing the second reliability score, for example record 111A and record 112B.

Optionally, in 820 processor 201 compares the second reliability score to a threshold reliability value. In 830, when the second reliability score is not better than the threshold reliability value, for example when the second reliability score is less than the threshold reliability value, processor 201 optionally identifies attribute value "NameX" of asset attribute "device name" as a faulty reference value.

Reference is now made again to FIG. 3. Optionally, processor 201 executes 510 in response to receiving the new set of records. Optionally, processor 201 executes 510 according to an identified schedule. The identified schedule may be periodic, repeating execution of 510 at an identified interval of time. Optionally, the identified schedule comprises a set of identified times.

In 520, processor 201 optionally selects from the plurality of asset-descriptors one or more faulty asset descriptors that were created based on the faulty reference values, for example asset-descriptor 121 that was created based on faulty reference value attribute value "NameX" of asset attribute "device name". Optionally, selecting the one or more faulty asset descriptors comprises using a reference from the faulty reference value to identify which of the plurality of digital asset-descriptors were created based on the faulty reference value. For example, processor 201 may use the reference from faulty reference value attribute value "NameX" of asset attribute "device name" to asset-descriptor 121 to identify that asset-descriptor 121 was created based on attribute value "NameX" of asset attribute "device name".

In 530, processor 201 optionally computes one or more new asset-descriptors using faulty asset-descriptor 121. Reference is now made again to FIG. 7. In this example, processor 201 computes new asset-descriptor 122. Optionally, processor 201 uses faulty asset-descriptor 121 to create new asset descriptor 122. Optionally, processor 201 updates faulty asset-descriptor 121 to create a corrected asset-descriptor 121, for example by removing one or more values from asset-descriptor 121, for example an association between asset-descriptor 121 and entity descriptor 732 that describes device 102. Optionally, the one or more values were added to asset-descriptor 121 according to one or more rules, where the one or more rules are referenced in the reference from the attribute value "NameX" of asset attribute "device name" to asset-descriptor 121. Optionally, processor 201 computes new asset descriptor 122 using entity descriptor 732. Optionally, computing new asset-descriptor 122 comprises applying the plurality of rules to a set of records referenced by the second reliability score of the faulty reference value attribute value "NameX" of asset attribute "device name" and additionally or alternatively by the faulty asset-descriptor 121. Thus, in this example, computing new asset-descriptor 122 comprises applying the set of rules to the set of records comprising record 111A and 112B referenced by the second reliability score, and additionally be record 112A referenced by asset-descriptor 121. Optionally, record 111A and 112B are selected from the plurality of records 740 to be included in set of records using the one or more score record-references of the second reliability score of the faulty reference value attribute value "NameX" of asset attribute "device name".

Reference is now made again to FIG. 3. Optionally, processor 201 executes 820, 830, 520 and 530 in each of one or more iterations, computing one or more additional new asset-descriptors. Optionally, processor 201 adds the one or more new asset descriptors, and additionally or alternatively the one or more additional new asset-descriptors, to the plurality of asset descriptors.

Optionally, processor 201 provides the updated plurality of asset descriptors to one or more management tools managing system 200. Optionally, processor 201 stores the updated plurality of asset descriptors on storage 205.

In 540, processor 201 optionally executes one or more management operations associated with device 102, optionally using new asset-descriptor 122. Some examples of a management operation include, but are not limited to: modifying one or more values in one or more configuration files of the system 200, installing one or more software applications one or more of the plurality of devices of system 200, for example device 102, modifying one or more other values in one or more other configuration files of device 102, and sending a domain manager, for example domain manager 112, an instruction to execute an operation of management domain 322, optionally on device 102.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant reliability scores, assets, asset attributes and attribute values will be developed and the scope of the terms "reliability score", "asset", "asset attribute" and "attribute value" are intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for managing a plurality of assets of a computerized system, comprising:
   create a plurality of digital asset-descriptors:
   detecting in the plurality of digital asset-descriptors, each describing one of a plurality of assets of the computerized system, a faulty reference value, including:
     computing, using a plurality of digital records, each describing one of the plurality of assets and received from a domain manager of a management domain of the computerized system, at least one reliability score for at least one attribute value of at least one attribute of a plurality of asset attributes of the plurality of assets where the at least one attribute value of the at least one attribute was used when creating the plurality of digital asset-descriptors; and
     subject to an outcome of comparing a reliability score of the at least one reliability score to a threshold reliability value, identifying an attribute value for which the reliability score was computed as a faulty reference value;
   selecting from the plurality of digital asset-descriptors a faulty digital asset-descriptor created based on the faulty reference value;
   computing at least one new digital asset-descriptor using the faulty digital asset-descriptor, each describing an asset of the plurality of assets;
   executing in the computerized system and using a new digital asset-descriptor of the at least one new digital asset-descriptor at least one management operation associated with an asset described by the new digital asset-descriptor
   wherein the plurality of digital asset-descriptors are created by:
     applying a plurality of rules to another plurality of digital records, each of the other plurality of digital records describing another of the plurality of assets and received from another domain manager of another management domain of the computerized system, wherein applying a rule of the plurality of rules comprises comparing one or more attribute values in one or more of the other plurality of digital records to determine which records describe a common asset; and
     for each attribute value used when creating the plurality of digital asset-descriptors, maintaining at least one reference from the attribute value to at least one digital asset-descriptor created based on the attribute value using the plurality of rules.

2. The method of claim 1, wherein the management domain is one of a plurality of management domains of the computerized system; and
   wherein the domain manager is one of a plurality of domain managers for managing the computerized system.

3. The method of claim 1, wherein selecting the faulty digital asset-descriptor comprises using the reference from the faulty reference value to identify which of the plurality of digital asset-descriptors were created based on the faulty reference value.

4. The method of claim 1, wherein the reference from the attribute value to the at least one digital asset-descriptor further comprises at least one rule reference to at least one rule of the plurality of rules used when creating the at least one digital asset-descriptor; and
 wherein computing the at least one new digital asset-descriptor comprises removing from the faulty digital asset-descriptor one or more values added according to the at least one rule referenced by the at least one rule reference of the reference from the faulty reference value to the faulty digital asset-descriptor.

5. The method of claim 1, wherein computing the at least one new digital asset-descriptor using the faulty digital asset-descriptor comprises applying the plurality of rules to a set of digital records used to compute the faulty digital asset-descriptor and another set of digital records used to compute the reliability score of the faulty reference value.

6. The method of claim 5, wherein computing the at least one reliability score comprises maintaining at least one score record-reference from the at least one reliability score to one or more records of the plurality of digital records used to compute the at least one reliability score;
 wherein each digital asset-descriptor of the plurality of digital asset-descriptors comprises one or more asset record-references to one or more other digital records of the other plurality of digital records used to create the digital asset-descriptor;
 wherein the set of digital records used to compute the faulty digital asset-descriptor is selected from the other plurality of digital records using the one or more asset record-references of the faulty digital asset-descriptor; and
 wherein the other set of digital records used to compute the reliability score of the faulty reference value is selected from the plurality of digital records using the at least one score record-reference of the reliability score of the faulty reference value.

7. The method of claim 1, wherein the plurality of digital records comprises the other plurality of digital records, received in a first iteration of a plurality of data collection iterations, and a new set of digital records received in a second iteration of the plurality of data collection iterations; and
 wherein the new set of digital records is received after receiving the other plurality of digital records.

8. The method of claim 7, wherein computing the at least one reliability score is in response to receiving the new set of digital records.

9. The method of claim 1, further comprising, in each of one or more iterations:
 subject to another outcome of comparing another reliability score of the at least one reliability score to the threshold reliability value, identifying another attribute value for which the other reliability score was computed as another faulty reference value;
 selecting from the plurality of digital asset-descriptors another faulty digital asset-descriptor created based on the other faulty reference value; and
 computing at least one other new digital asset-descriptor using the other faulty digital asset-descriptor, each describing another asset of the plurality of assets.

10. The method of claim 1, wherein computing the at least one reliability score is according to an identified schedule.

11. The method of claim 1, wherein the at least one management operation comprises at least one of: installing an operating system update on one of the plurality of assets, and instructing execution of a management query by one of the plurality of assets.

12. A system for managing a plurality of assets of a computerized system, comprising at least one hardware processor configured to:
 create a plurality of digital asset-descriptors:
 detect in the plurality of digital asset-descriptors, each describing one of a plurality of assets of the computerized system, a faulty reference value, including by:
  computing, using a plurality of digital records, each describing one of the plurality of assets and received from a domain manager of a management domain of the computerized system, at least one reliability score for at least one attribute value of at least one attribute of a plurality of asset attributes of the plurality of assets where the at least one attribute value of the at least one attribute was used when creating the plurality of digital asset-descriptors; and
  subject to an outcome of comparing a reliability score of the at least one reliability score to a threshold reliability value, identifying an attribute value for which the reliability score was computed as a faulty reference value;
 select from the plurality of digital asset-descriptors a faulty digital asset-descriptor created based on the faulty reference value;
 compute at least one new digital asset-descriptor using the faulty digital asset-descriptor, each describing an asset of the plurality of assets; and
 execute in the computerized system and using a new digital asset-descriptor of the at least one new digital asset-descriptor at least one management operation associated with an asset described by the new digital asset-descriptor;
 wherein the plurality of digital asset-descriptors are created by:
 applying a plurality of rules to other plurality of digital records, each of the other plurality of digital records describing another of the plurality of assets and received from another domain manager of another management domain of the computerized system, wherein applying a rule of the plurality of rules comprises comparing one or more attribute values in one or more of the other plurality of digital records to determine which records describe a common asset, and
 for each attribute value used when creating the plurality of digital asset-descriptors, maintaining at least one reference from the attribute value to at least one digital asset-descriptor created based on the attribute value using the plurality of rules.

13. The system of claim 12, further comprising at least one digital communication network interface connected to the at least one hardware processor; and
 wherein the at least one hardware processor is configured to receive at least some of the plurality of digital records via the at least one digital communication network interface.

14. The system of claim 12, wherein the domain manager comprises at least one other hardware processor configured to manage the computerized system in the management domain; and
 wherein the at least one hardware processor is further configured to receive at least some of the plurality of digital records from the at least one other hardware processor.

15. The system of claim 12, further comprising a non-volatile digital storage connected to the at least one hardware processor;

wherein the at least one hardware processor is further configured to retrieve at least some of the plurality of digital records from the non-volatile digital storage.

16. A software program product for managing a plurality of assets of a computerized system, comprising:

a non-transitory computer readable storage medium;

first program instructions for creating a plurality of digital asset-descriptors and detecting in a plurality of digital asset-descriptors, each describing one of a plurality of assets of the computerized system, a faulty reference value, including: computing, using a plurality of digital records, each describing one of the plurality of assets and received from a domain manager of a management domain of the computerized system, at least one reliability score for at least one attribute value of at least one attribute of a plurality of asset attributes of the plurality of assets where the at least one attribute value of the at least one attribute was used when creating the plurality of digital asset-descriptors; and subject to an outcome of comparing a reliability score of the at least one reliability score to a threshold reliability value, identifying an attribute value for which the reliability score was computed as a faulty reference value;

second program instructions for selecting from the plurality of digital asset-descriptors a faulty digital asset-descriptor created based on the faulty reference value;

third program instructions for computing at least one new digital asset-descriptor using the faulty digital asset-descriptor, each describing an asset of the plurality of assets; and fourth program instructions for executing in the computerized system and using a new digital asset-descriptor of the at least one new digital asset-descriptor at least one management operation associated with an asset described by the new digital asset-descriptor;

wherein the first, second, third and fourth program instructions are executed by at least one computerized processor from the non-transitory computer readable storage medium;

wherein the plurality of digital asset-descriptors are created by:

applying a plurality of rules to other plurality of digital records, each of the other plurality of digital records describing another of the plurality of assets and received from another domain manager of another management domain of the computerized system, wherein applying a rule of the plurality of rules comprises comparing one or more attribute values in one or more of the other plurality of digital records to determine which records describe a common asset, and for each attribute value used when creating the plurality of digital asset-descriptors, maintaining at least one reference from the attribute value to at least one digital asset-descriptor created based on the attribute value using the plurality of rules.

* * * * *